(12) United States Patent  (10) Patent No.: US 7,938,586 B2
Matsumoto  (45) Date of Patent: May 10, 2011

(54) MOBILE TERMINAL APPARATUS AND SLIDING COVER DEVICE

(75) Inventor: Masao Matsumoto, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 226 days.

(21) Appl. No.: 12/418,851

(22) Filed: Apr. 6, 2009

(65) Prior Publication Data
US 2009/0279884 A1 Nov. 12, 2009

(30) Foreign Application Priority Data
May 8, 2008 (JP) .................................. 2008-121872

(51) Int. Cl.
*G03B 17/04* (2006.01)
(52) U.S. Cl. ...................................................... 396/448
(58) Field of Classification Search .................. 396/448
See application file for complete search history.

(56) References Cited

U.S. PATENT DOCUMENTS

| | | | | |
|---|---|---|---|---|
| 3,051,999 A | * | 9/1962 | Schimek | 49/212 |
| 5,004,280 A | * | 4/1991 | Schap | 292/341.16 |
| 6,135,652 A | * | 10/2000 | Owashi et al. | 396/349 |
| 6,398,426 B1 | * | 6/2002 | Takanashi | 396/448 |
| 6,428,091 B2 | * | 8/2002 | Ito et al. | 296/221 |
| 6,893,083 B2 | * | 5/2005 | Engl | 296/216.03 |
| 7,798,557 B2 | * | 9/2010 | Elliott et al. | 296/146.12 |

* cited by examiner

*Primary Examiner* — W. B. Perkey
(74) *Attorney, Agent, or Firm* — Oblon, Spivak, McClelland, Maier & Neustadt, L.L.P.

(57) ABSTRACT

A mobile terminal apparatus includes a camera unit and a sliding cover device. The sliding cover device includes a cover slidable with respect to the camera unit, a pair of arm members supporting the cover on both sides from a back surface of the cover and extending along the sides of the cover, a frame member supporting the arm members such that the arm members are slidable along respectively predetermined sliding paths, and a body surface member secured to the frame member and having a surface thereof flush with a surface of the cover at a closed position. The sliding paths are defined such that, when the cover is moved from the closed position to an open position, the arm members slide into a space below the body surface member and the cover rides onto the body surface member.

10 Claims, 15 Drawing Sheets

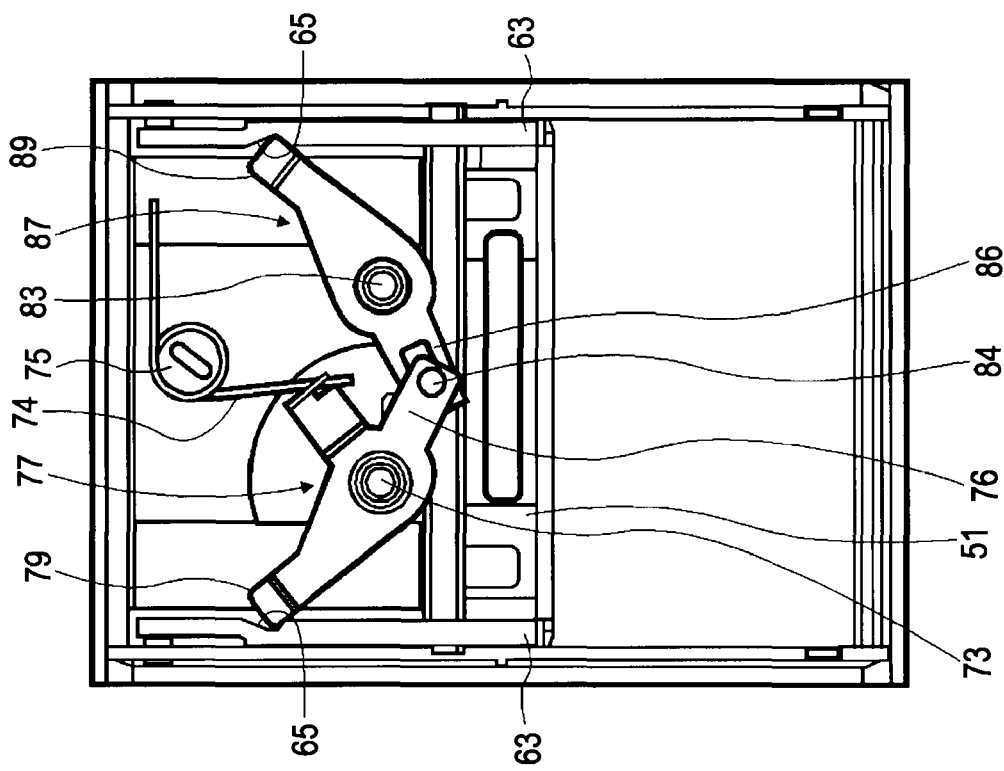
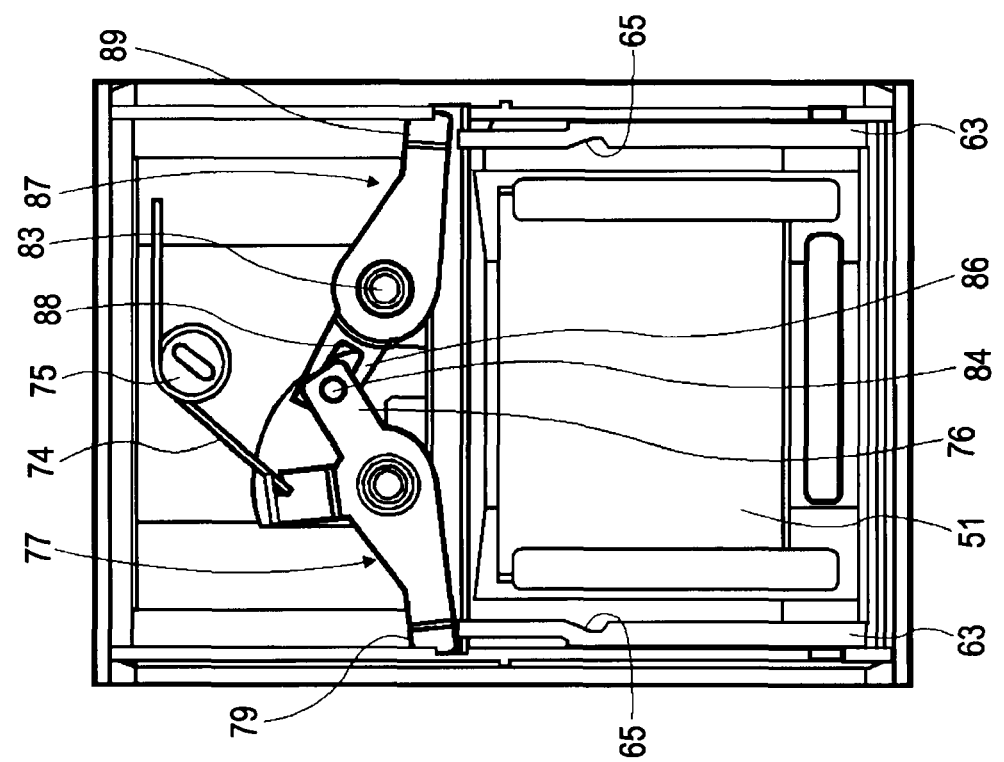
FIG. 15A
FIG. 15B

MOBILE TERMINAL APPARATUS AND SLIDING COVER DEVICE

BACKGROUND OF THE INVENTION

1. Field of the Invention

The present invention relates to mobile terminal apparatuses each having a cover slidable between a closed position and an open position, and to sliding cover devices.

2. Description of the Related Art

FIG. 1 is a conceptual diagram showing the configuration of a digital camera apparatus A as a related-art example. The apparatus A includes a camera C and a slidable cover A1 protecting a lens of the camera C. When the camera C is not in use, the cover A1 is closed at a position A2. When the cover A1 is slid to a position A3, the lens of the camera C appears, whereby shooting is enabled. The cover A1 projects from the surface of a body of the apparatus A, at either position A2 or A3. Therefore, the thickness of the apparatus A is largest at a portion where the cover A1 resides. A user sees the cover A1 as a projection. As a matter of design, such a projection prevents the apparatus A from being compact and having simple appearance. In short, the cover A1 is desired not to project.

FIG. 2 is a conceptual diagram showing the configuration of a mobile phone terminal B as another exemplary related-art example. As in the case of the apparatus A, the mobile phone terminal B has a sliding cover B1. In general, a mobile phone terminal has a narrower body than a digital camera apparatus. Accordingly, the size of the cover of the mobile phone terminal is smaller than that of the digital camera apparatus.

Now, to avoid such projecting covers as in the apparatus A and the terminal B of the related-art examples, a flat configuration in which an apparatus has a cover whose surface is flush with the surface of a body of the apparatus when the cover is closed will be considered. FIG. 3 shows an apparatus D, which is similar to a digital camera apparatus. The apparatus D has a cover D1 capable of becoming flush with a body thereof at a flat surface level D2. When the cover D1 is moved by a sliding length f1 so that a camera C can be used, shooting is enabled. In this case, the sliding length f1 is determined by considering only a length sufficient for allowing the use of the camera C. The apparatus D has a portion D3 (a length f3) with respect to a total length f2 of the body in the sliding direction. The portion D3 is kept shielded by the cover D1, regardless of whether the cover D1 is open or closed. A mechanism that causes the cover D1 to slide, a stopper, and so forth can be provided in the portion D3. Such internal mechanisms are shielded by the cover D1 from a user's sight. In this configuration, the cover D1 at the flat surface level D2 can be lifted up and moved to an open position without spoiling the aesthetics of design.

FIG. 4 shows an apparatus E, which is similar to a mobile phone terminal, equipped with a camera C and having substantially the same configuration as the apparatus D. As described above, a mobile phone terminal has a narrower body than a digital camera apparatus, and accordingly the size of the cover of the mobile phone terminal is smaller than that of the digital camera apparatus. A cover E1 at a closed position is flush with a body of the apparatus E at a flat surface level E2. In this case, it is difficult to provide a shielded portion, corresponding to the portion D3 of the apparatus D, because a total length g2 of the body in the sliding direction is short relative to a sliding stroke g1 by which the cover E1 is moved so as to allow the use of the camera C. Even if some shielded portion could be provided, such a portion is insufficient for the internal mechanisms to be provided therein.

Although the lengths f1 and g1 by which the respective covers D1 and E1 are slid are substantially the same, the apparatus E has a smaller total length than the apparatus D. Therefore, it is difficult to provide the apparatus E with a shielded portion, similar to that of the apparatus D, in which the internal mechanisms are provided.

To solve such a problem in the apparatus E, it is possible to reduce the size of the camera C to be included. In that case, however, another problem of deterioration in shooting quality, zooming function, and the like may arise.

SUMMARY OF THE INVENTION

In each of the related-art examples, the internal mechanisms, including sliding mechanisms, are provided in a region spreading parallel to the surface of the cover. Therefore, depending on the length of the movement stroke of the cover, the internal mechanisms may be exposed when the cover is open.

For such a reason, it is difficult in the related-art examples to meet all of the demands that the cover at the closed position be prevented from projecting from the surface of the apparatus body, the internal mechanisms be prevented from being exposed when the cover is open, and the size of the sliding cover device be reduced.

In view of such circumstances, it is desirable that the present invention provides a sliding cover device and a mobile phone terminal apparatus having reduced sizes without spoiling the aesthetics of designs thereof.

According to an embodiment of the present invention, a mobile terminal apparatus includes a camera unit and a sliding cover device. The sliding cover device includes a cover slidable with respect to the camera unit, a pair of arm members supporting the cover on both sides from a back surface of the cover and extending along the sides of the cover, a frame member supporting the arm members such that the arm members are slidable along respectively predetermined sliding paths, and a body surface member secured to the frame member and having a surface thereof flush with a surface of the cover at a closed position. The sliding paths are defined such that, when the cover is moved from the closed position to an open position, the arm members slide into a space below the body surface member and the cover rides onto the body surface member.

In the embodiment, since mechanisms that slide the cover are provided on the sides of the cover, the sliding mechanisms can be provided substantially within the thickness of the frame member, unlike the related-art examples in which such mechanisms are provided in a region spreading parallel to the surface of the cover. In addition, since the arm members are provided on both sides of the back surface of the cover and are supported by and along both sides of the frame member, a region to be protected at the back of the cover when the cover is closed is not covered by any mechanisms other than the cover, regardless of whether the cover is open or closed. Thus, no internal mechanisms are exposed, and the cover can be moved by a relatively large length.

In the mobile terminal apparatus according to the embodiment, the sliding paths may be defined such that, when the cover is moved from the closed position to the open position, the cover is lifted up and is subsequently moved parallel to the surface of the body surface member. Therefore, the surface of the cover at the closed position can be easily made flush with the surface of the body surface member.

The mobile terminal apparatus according to the embodiment may further include an urging-locking mechanism configured to continuously apply an urging force to at least one of the arm members in such a direction that the cover is closed, and to lock the cover at the open position, the mechanism being provided on a back surface of the body surface member. The urging-locking mechanism staying on the back surface of the body surface member is out of a user's sight.

According to another embodiment of the present invention, a sliding cover device includes a cover slidable between a closed position and an open position, a pair of arm members supporting the cover on both sides from a back surface of the cover and extending along the sides of the cover, a frame member supporting the arm members such that the arm members are slidable along respectively predetermined sliding paths, and a body surface member secured to the frame member so as to adjoin the cover at the closed position, and having a surface thereof flush with a surface of the cover at the closed position. The sliding paths are defined such that, when the cover is moved from the closed position to the open position, the arm members slide into a space below the body surface member and the cover rides onto the body surface member. The sliding cover device produces the same advantages as those described for the mobile terminal apparatus.

According to the embodiments of the present invention, there can be provided a sliding cover device suitable for small-sized apparatuses, avoiding a configuration including a cover projecting from the surface of an apparatus body and exposure of internal mechanisms when the cover is open, and a mobile terminal apparatus including the sliding cover device.

Further features and advantages of the present invention will be given in the following description of preferred embodiments.

BRIEF DESCRIPTION OF THE DRAWINGS

FIGS. 15A and 15B show a variation of the mechanism shown in FIG. 13.

DESCRIPTION OF THE PREFERRED EMBODIMENTS

Embodiments of the mobile terminal apparatus including the sliding cover device according to the present invention will now be described in detail.

Figure 1:
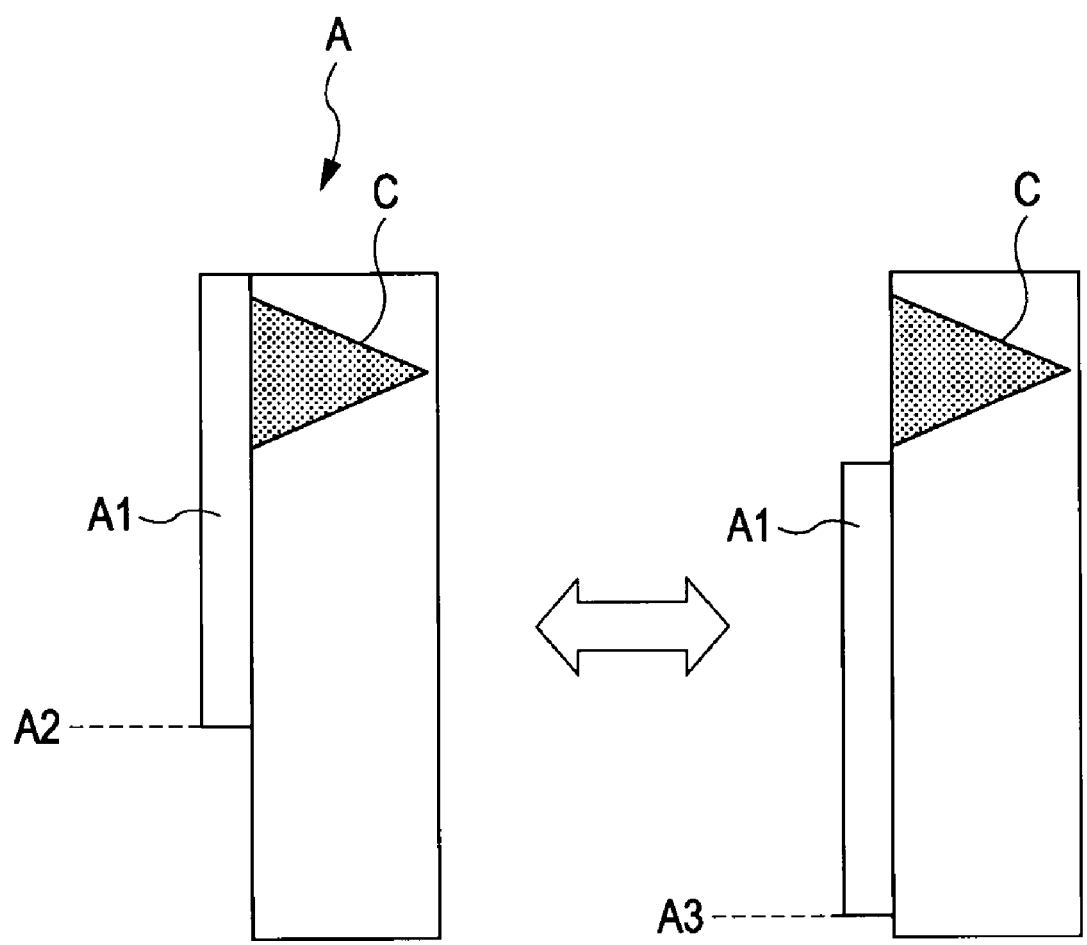
FIG. 1 is a conceptual diagram showing the configuration of an exemplary related-art digital camera apparatus.
Figure 2:
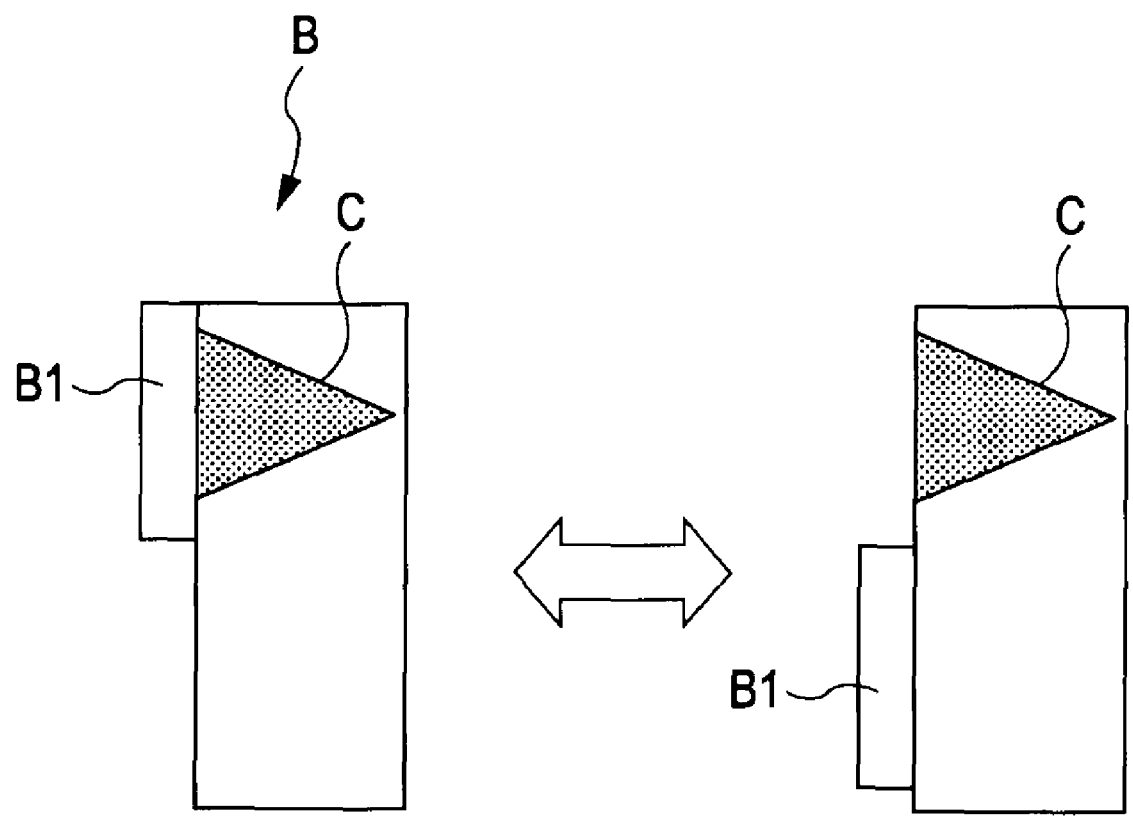
FIG. 2 is a conceptual diagram showing the configuration of an exemplary related-art mobile phone terminal.
Figure 3:
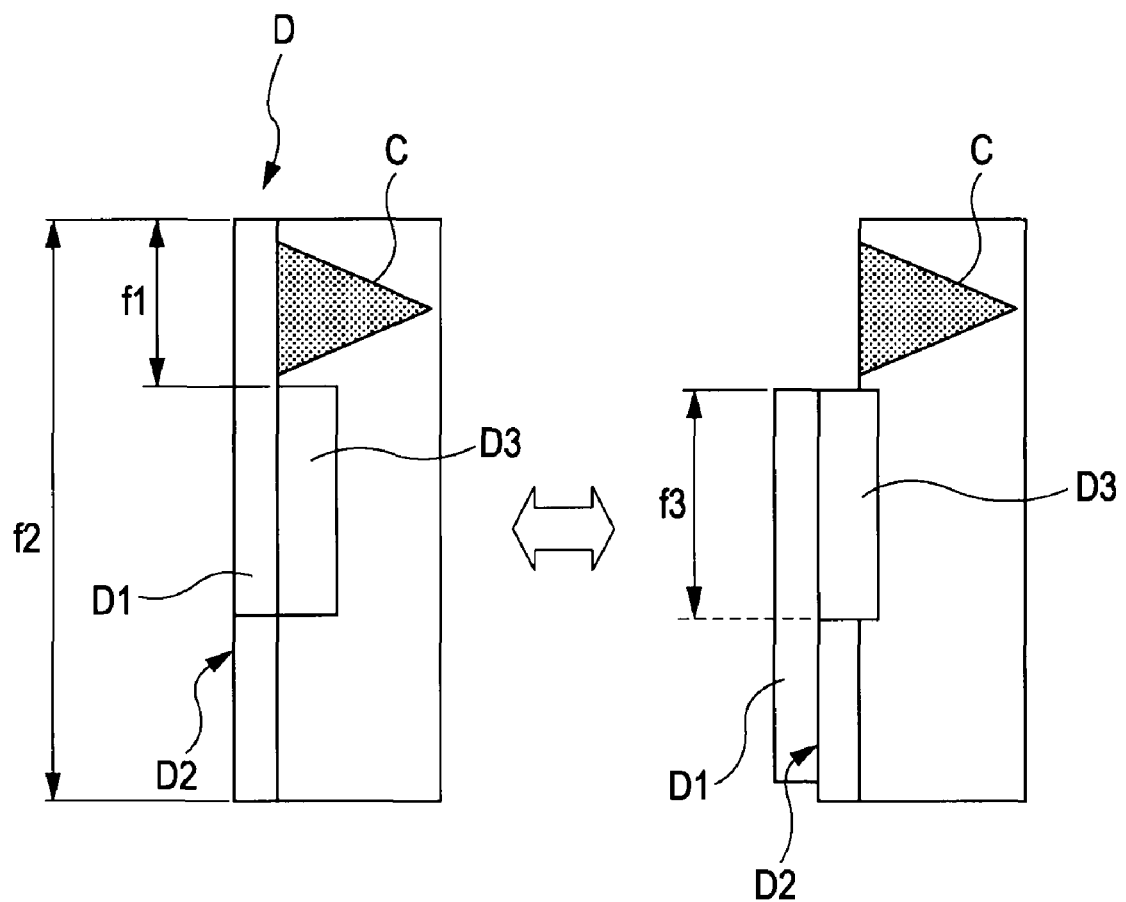
FIG. 3 shows an apparatus similar to the related-art digital camera apparatus.
Figure 4:
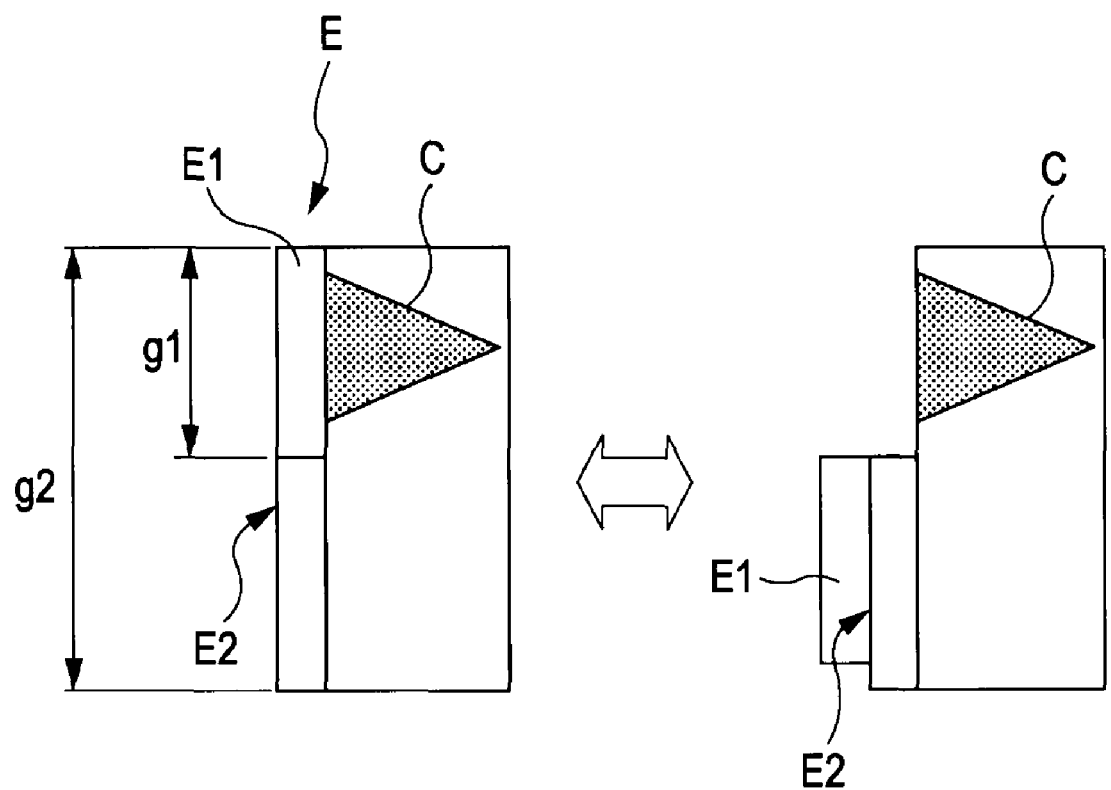
FIG. 4 shows an apparatus similar to a camera-equipped mobile phone terminal having substantially the same configuration as the apparatus shown in FIG. 3.
Figure 5A:
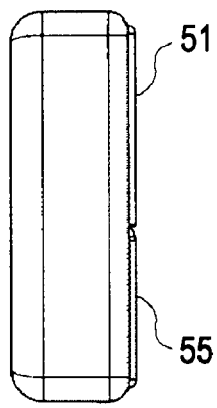
FIGS. 5A to 5D show the appearance of a camera-equipped mobile phone terminal apparatus 100 including a sliding cover device according to an embodiment of the present invention.
Figure 5B:
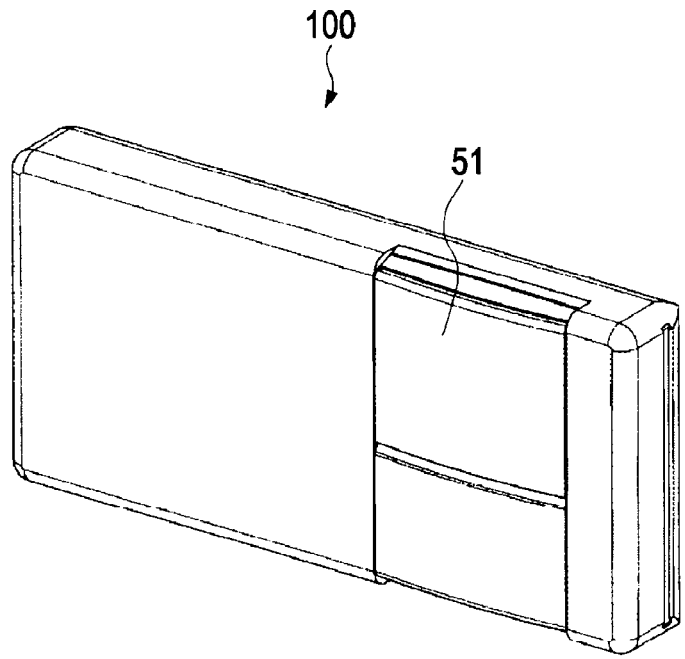
Figure 5C:
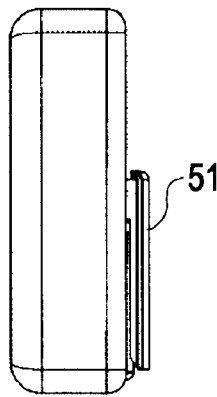
Figure 5D:
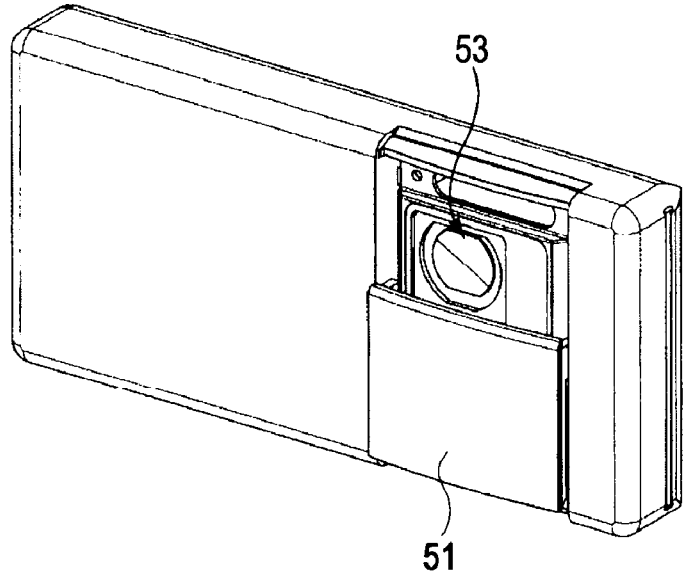

FIGS. 5A to 5D show the appearance of a camera-equipped mobile phone terminal apparatus 100 including a sliding cover device according to an embodiment of the present invention. FIGS. 5A and 5B are a left-side view and a perspective view, respectively, of the terminal apparatus 100, with a cover 51 closed. FIGS. 5C and 5D are a left-side view and a perspective view, respectively, of the terminal apparatus 100, with the cover 51 open. In FIGS. 5A to 5D, as a matter of convenience, a side of the terminal apparatus 100 that a camera unit 53, or a lens thereof, appears is considered as the front side, regardless of the actual front side of the terminal apparatus 100.

When the cover 51 is at a closed position, the camera unit 53 included in the terminal apparatus 100 is shielded and protected by the cover 51. When the cover 51 is moved from the closed position to an open position, the camera unit 53 is exposed. With the cover 51 closed, the surface of the cover 51 is flush with the surface of a body surface member 55, which is provided at a fixed position adjoining the cover 51. Specifically, as can be seen from the side view shown in FIG. 5A, when the cover 51 is at the closed position, the cover 51 does not project from a body of the terminal apparatus 100, that is, the body of the terminal apparatus 100 has a flat surface, although the surface of the cover 51 may have a slight curve as a design. As can be seen from FIGS. 5C and 5D, when the cover 51 is moved from the closed position to the open position, the cover 51 rides onto the body surface member 55.

In a sliding operation of the cover 51 to the open position, the cover 51 can be moved by a length about a half of the total length of the terminal apparatus 100 in a sliding direction. Internal mechanisms, such as a sliding mechanism, are out of a user's sight, regardless of whether the cover 51 is at the closed position or the open position.

Figure 6:
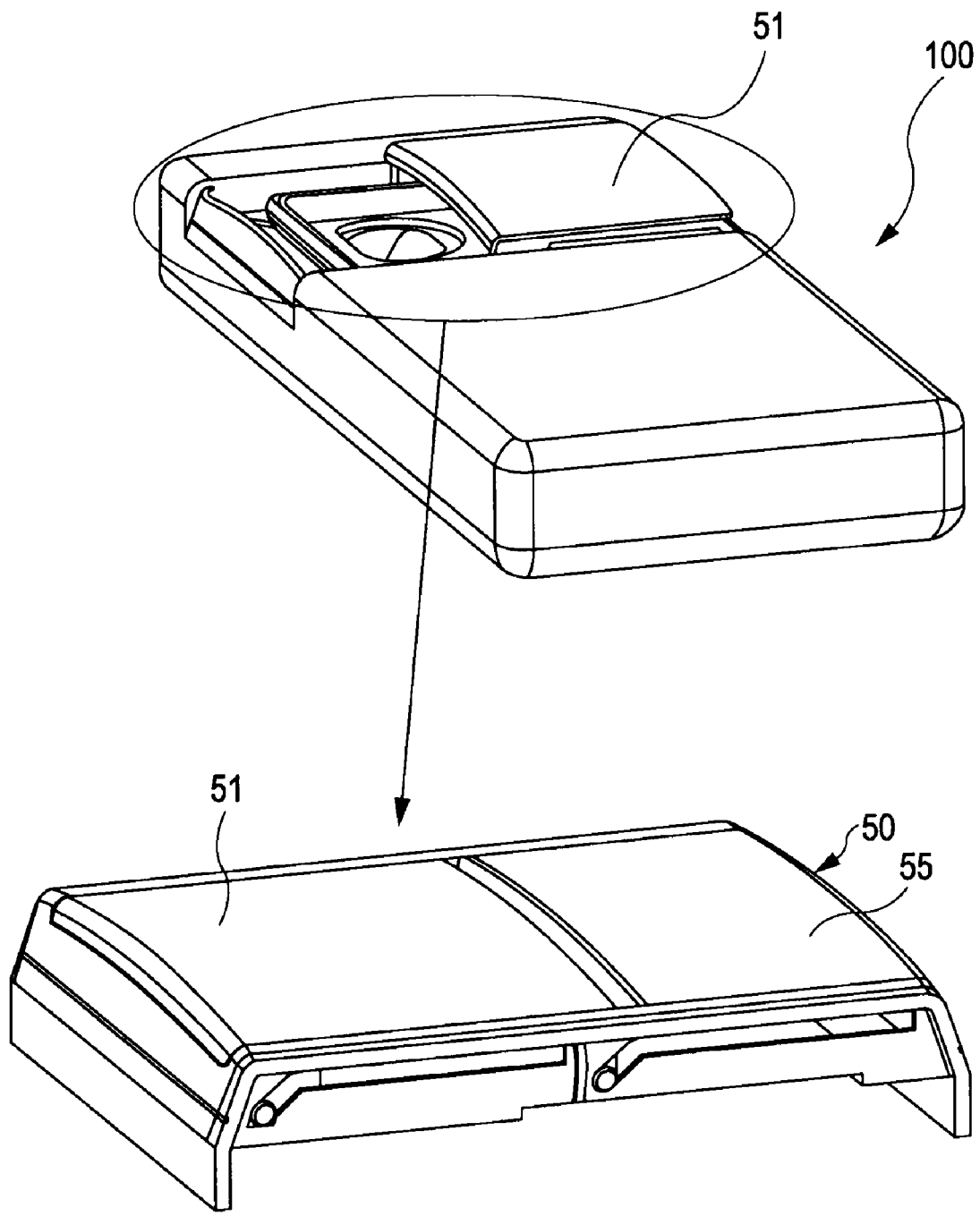
FIG. 6 shows the sliding cover device according to the embodiment of the present invention included in the terminal apparatus 100 shown in FIGS. 5A to 5D.

A sliding cover device 50, shown in FIG. 6, according to the embodiment of the present invention included in the terminal apparatus 100 will now be described.

Figure 7:
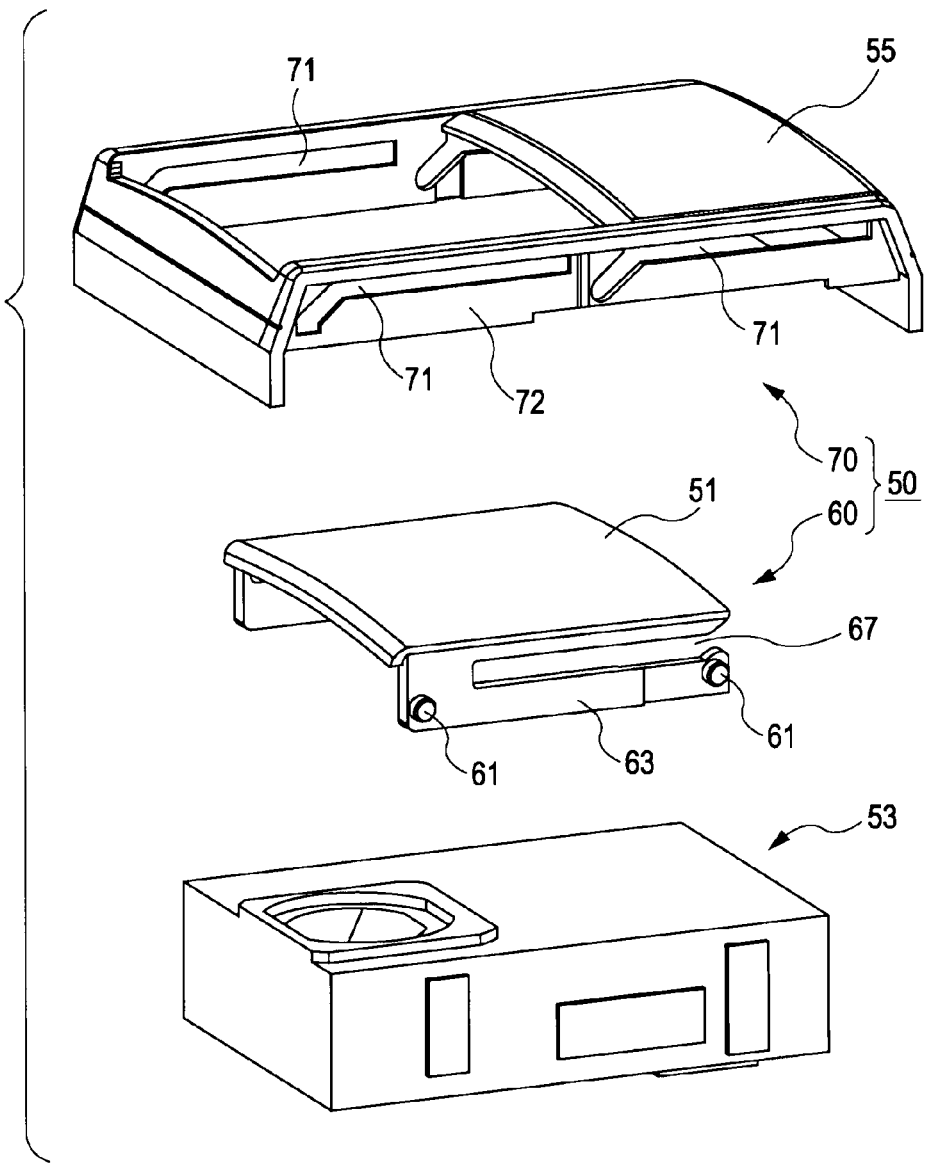
FIG. 7 is an exploded perspective view of the sliding cover device according to the embodiment of the present invention.

FIG. 7 is an exploded perspective view showing the entire configuration of the sliding cover device 50.

A cover unit 60 includes the cover 51 and a pair of arm members 63. The cover 51 has a plate-like shape with a slightly curved surface. The arm members 63 support the cover 51 from the back on both sides of the cover 51 and extend along the sides of the cover 51. The arm members 63 each include a base portion and a cantilever free-end portion. The base portion is connected to the cover 51. The cantilever free-end portion extends from the base portion along the side of the cover 51. The tip of the free-end portion of each arm member 63 reaches a position substantially facing an end of the cover 51. A clearance (space) 67 is provided between the cover 51 and each of the arm members 63. Further, the arm members 63 are each provided with two cylindrical projections (bosses) 61, as projecting portions, on the outer wall near respective ends in the longitudinal direction thereof. In total, four cylindrical projections 61 are provided on the arm members 63. Such constituents of the cover unit 60 can be made of synthetic resin or the like molded as an integral body. Alternatively, the constituents may be formed individually and subsequently assembled together.

A case 70 includes a frame member supporting the pair of arm members 63 such that the arm members 63 can slide along respectively predetermined sliding paths. The case 70 also includes the body surface member 55. The body surface member 55 is provided at a fixed position adjoining the cover 51 at the closed position, and has the surface thereof flush with the surface of the cover 51. The case 70 also has four cam grooves 71, as the sliding paths, in the inner surfaces of side walls 72 of the frame member, in correspondence with the four cylindrical projections 61. Specifically, two cam grooves 71 are provided for two of the cylindrical projections 61, respectively, on each side of the case 70. With the cam grooves 71, when the cover 51 is moved from the closed position to the open position, the arm members 63 can slide into a space below the body surface member 55 and the cover 51 can ride onto the body surface member 55. The cam grooves 71 receive and guide the respective cylindrical projections 61 provided on the arm members 63.

In coupling the cover 51 onto the case 70, the cylindrical projections 61 on the arm members 63 are fitted into the respective cam grooves 71, whereby the cover 51 can be slidably coupled to the case 70. The sliding paths are defined by the cam grooves 71 such that the cover 51 is lifted from the closed position obliquely upward and is then moved parallel to the surface of the body surface member 55 to the open position. The cam grooves 71, which pass through the side walls 72, may alternatively be bottomed grooves provided in the inner surfaces of the side walls 72.

The camera unit 53 is disposed facing the back surface of the cover 51, between the pair of arm members 63 and between the cam grooves 71 of the case 70. The interval between the pair of arm members 63 (and the interval between the cam grooves 71) is determined in accordance with the size of the camera unit 53.

The arm members 63 and the cam grooves 71 of the embodiment are positioned on the sides of the sliding cover device 50, i.e., along side walls of the camera unit 53, in a state of an assembly as the terminal apparatus 100. Therefore, as long as a mechanism including the arm members 63 and the cam grooves 71 has a thickness smaller than that of the camera unit 53, the sliding cover device 50, including the arm members 63 and the cam grooves 71, can be provided substantially within the thickness of the camera unit 53. Accordingly, the thickness of the terminal apparatus 100 can be reduced.

Figure 8:
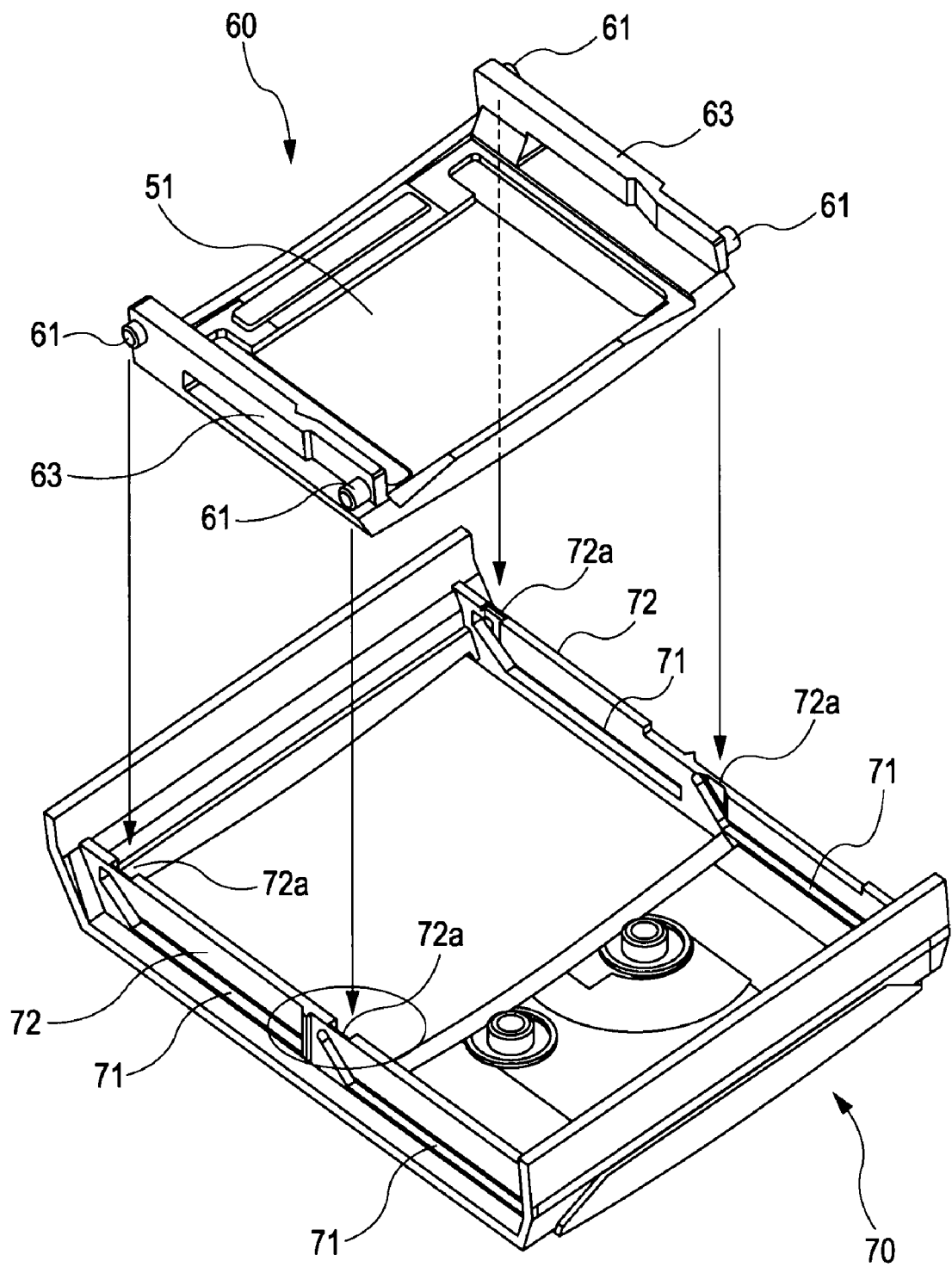
FIG. 8 shows a manner of fitting a cover into a case in the sliding cover device according to the embodiment of the present invention.

FIG. 8 shows a manner of fitting the cover 51 into the case 70. The case 70 has four notches 72a in the side walls 72 provided with the cam grooves 71. Specifically, the side walls 72 each have two notches 72a. The cylindrical projections 61 provided on the arm members 63 of the cover 51 are fitted through the notches 72a. The cover 51 is desirably made of a highly rigid material so that a sufficient strength can be provided, while the case 70 is preferably made of a flexible material, such as resin, so as to bend when the cover 51 is fitted thereinto. The notches 72a, provided for this fitting process, are provided at halfway positions in a movement stroke of the cover 51. Therefore, the cover 51 at the closed position or the open position is not affected by the notches 72a, and the engagement between the cover 51 and the case 70 is not easily lost during use.

FIGS. 9A to 10C show the movement mechanism of the sliding cover device 50 according to the embodiment.

Figure 9A:
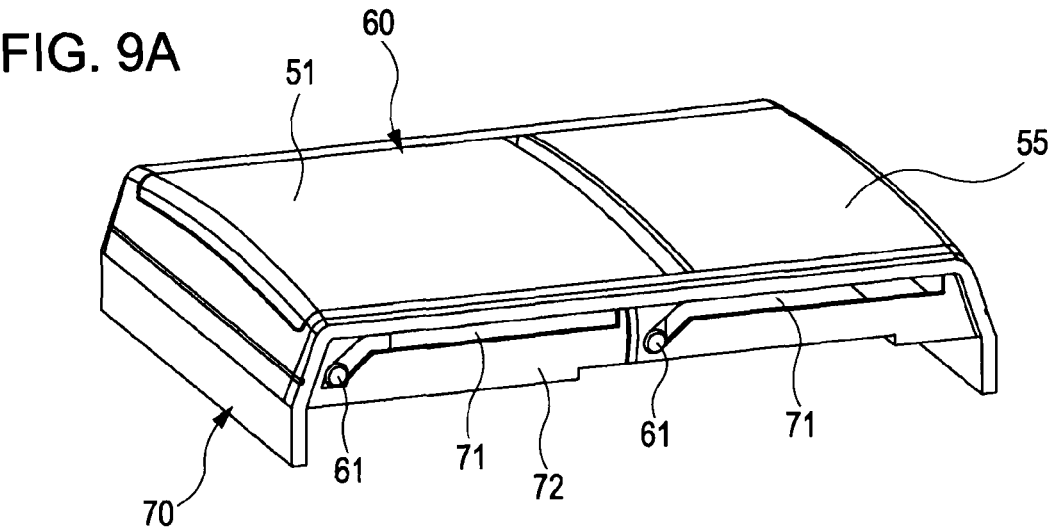
FIGS. 9A to 9C are diagrams for describing the movement mechanism of the sliding cover device according to the embodiment of the present invention.
Figure 9B:
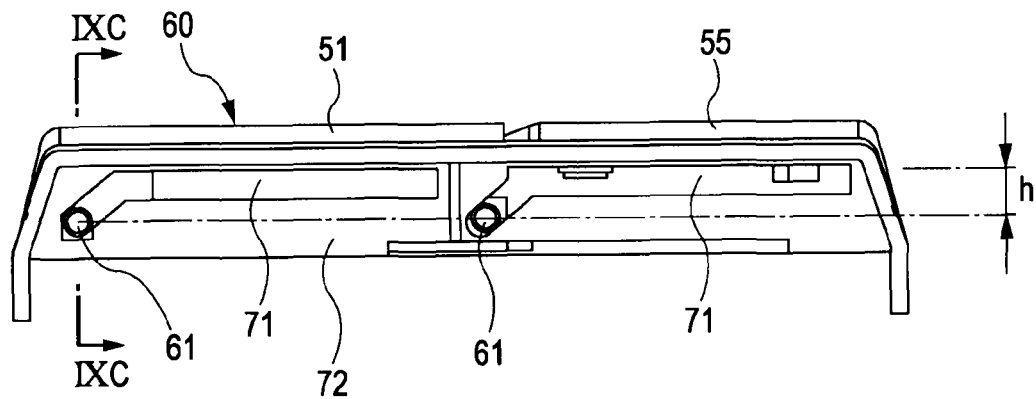
Figure 9C:
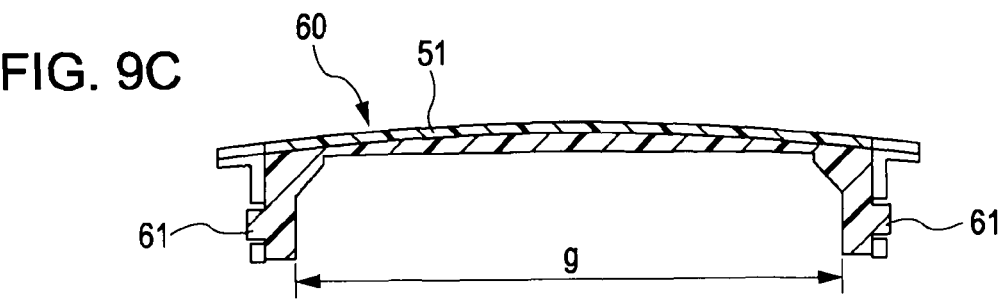

FIGS. 9A and 9B are a perspective view and a side view, respectively, of the sliding cover device 50, with the cover 51 closed. FIG. 9C is a cross-sectional view taken along the line IXC-IXC shown in FIG. 9B, the line passing the centers of the cylindrical projections 61.

Figure 10A:
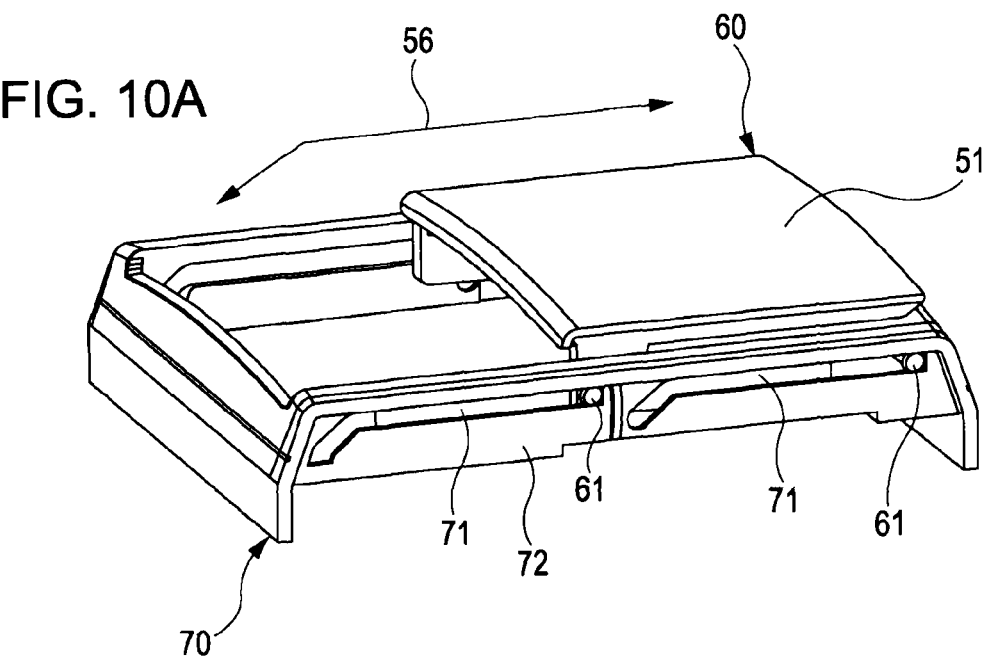
FIGS. 10A to 10C are other diagrams for describing the movement mechanism of the sliding cover device according to the embodiment of the present invention.
Figure 10B:
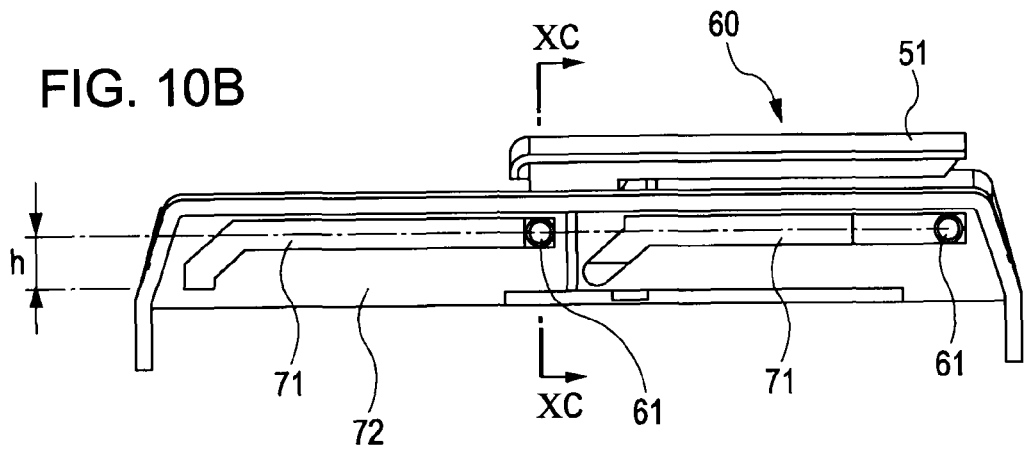
Figure 10C:
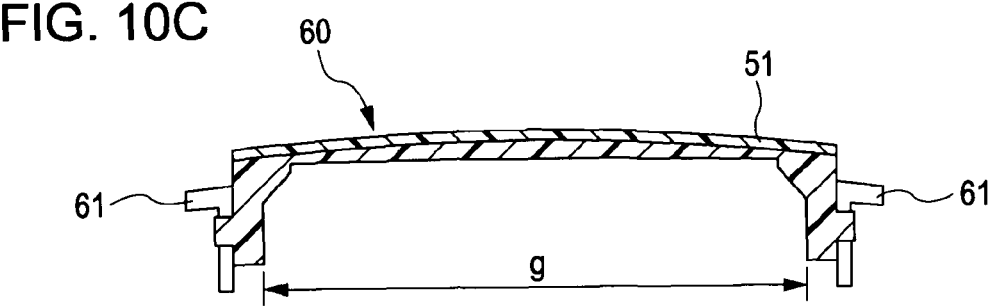

FIGS. 10A and 10B are a perspective view and a side view, respectively, of the sliding cover device 50, with the cover 51 open. FIG. 10C is a cross-sectional view taken along the line XC-XC shown in FIG. 10B.

The cylindrical projections 61 of the cover 51 are engaged with and regulated by the respective cam grooves 71 of the case 70. In closing the cover 51, the cylindrical projections 61 are stopped by ends (closed position stoppers) of the respective cam grooves 71. As can be seen from FIG. 9C, the cylindrical projections 61 are fitted in the cam grooves 71, and the interval between the arm members 63 of the cover 51 is regulated to be a width g. In this fashion, together with the elastic force of the arm members 63, wobbling of the arm members 63 and consequently the cover 51 is minimized.

When an external force is applied by a user in either of the directions indicated by the double-headed arrow 56 shown in FIG. 10A, the cover 51 slides along the cam grooves 71. The cover 51 is lifted up from the closed position along the cam grooves 71 by a predetermined lifting length h, and then slides in the horizontal direction. When the cover 51 has moved a predetermined length of stroke, the cylindrical projections 61 each come into contact with the other end, serving as an open position stopper, of the corresponding cam groove 71, whereby the cover 51 stops. Referring to FIG. 10C, when the cover 51 is at the open position, the state of the cylindrical projections 61 fitted in the cam grooves 71 is unchanged, with the interval between the arm members 63 being the width g. Therefore, wobbling of the cover 51 can be suppressed.

FIG. 10B clearly shows that the length of the cover 51 in the sliding direction is a little larger than that of the body surface member 55. Accordingly, each two of the cylindrical projections 61 provided on the corresponding one of the arm members 63 are fitted in two different cam grooves 71. As can be seen from FIG. 9B and other drawings, the cam grooves 71 provided below the body surface member 55 each extend such that the oblique end thereof comes to directly below an end of the cover 51 at the closed position. In such a configuration, the arm members 63 can be provided with lengths not larger than the length of the cover 51, and the cover 51 at the closed position can have the surface thereof flush with the surface of the body surface member 55.

Figure 11A:
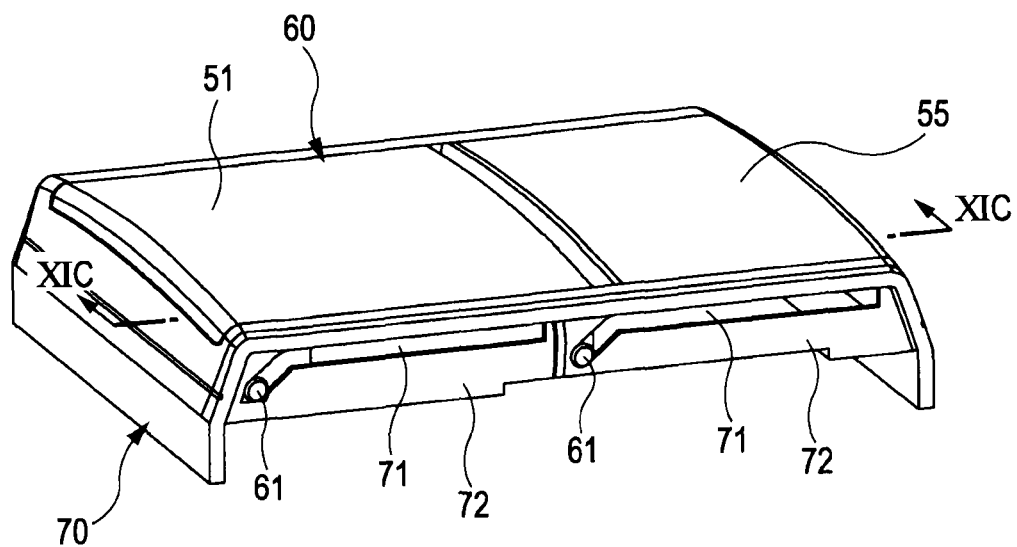
FIGS. 11A to 11C are diagrams for describing the strength of the sliding cover device according to the embodiment of the present invention.
Figure 11B:
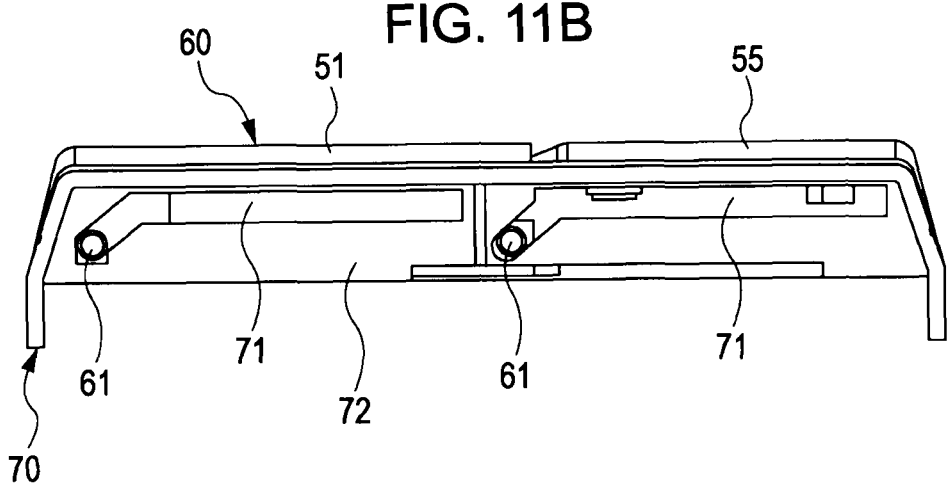
Figure 11C:
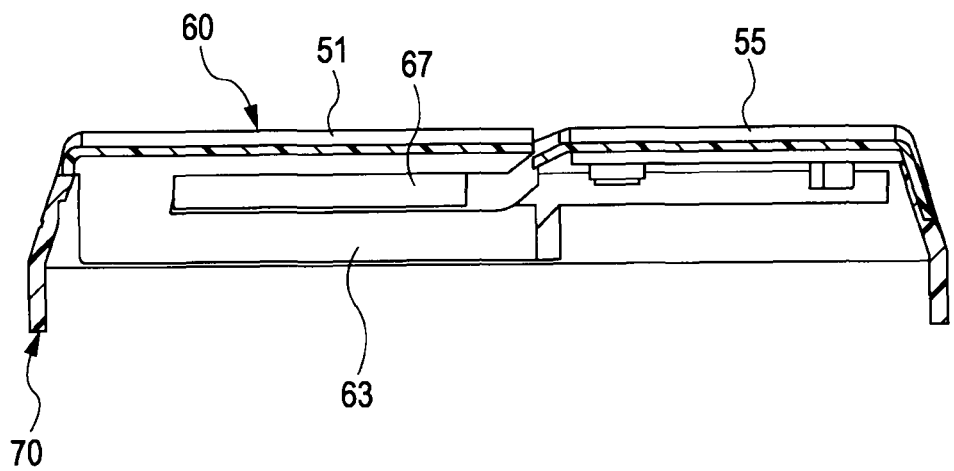
Figure 12A:
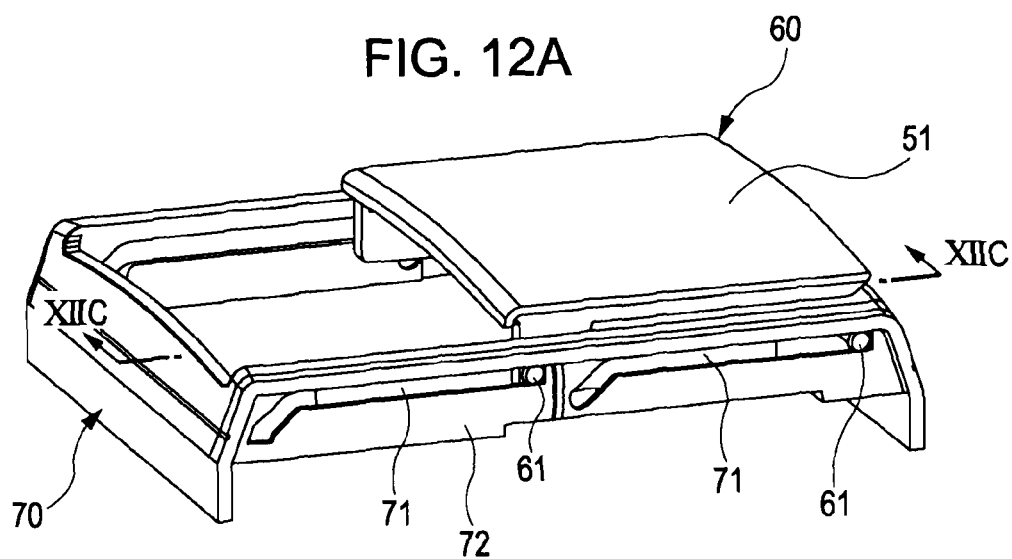
FIGS. 12A to 12C are other diagrams for describing the strength of the sliding cover device according to the embodiment of the present invention.
Figure 12B:
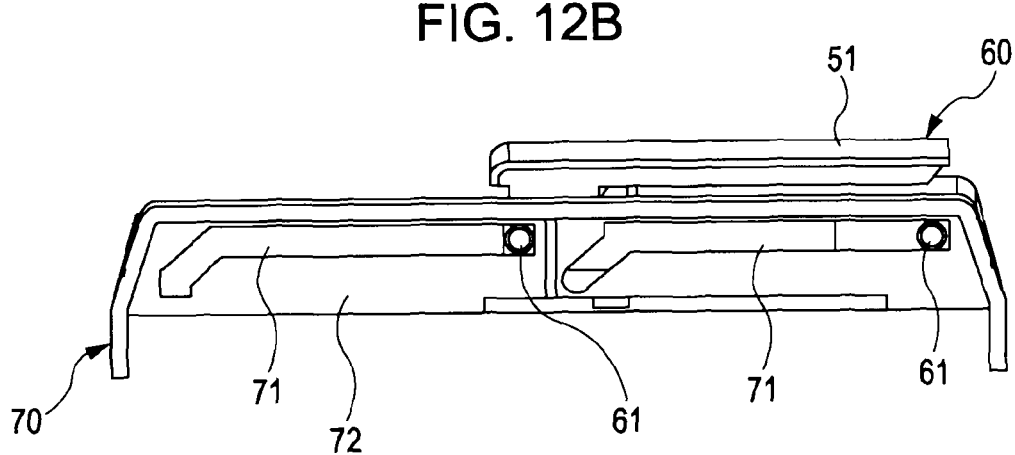
Figure 12C:
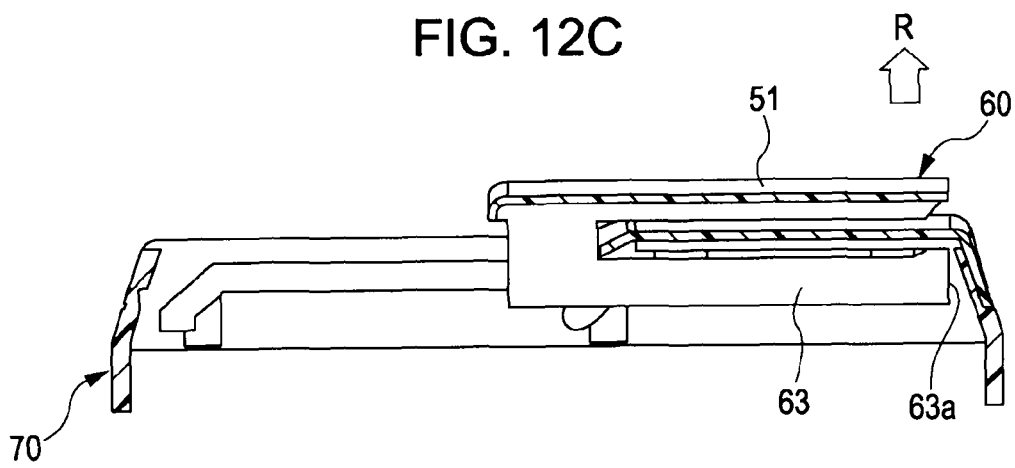

Referring to FIGS. 11A to 12C, the strength of the sliding cover device 50 will now be described. FIGS. 11A and 11B are a perspective view and a side view, respectively, of the sliding cover device 50, with the cover 51 closed. FIG. 11C is a cross-sectional view taken along the line XIC-XIC shown in FIG. 11A. FIGS. 12A and 12B are a perspective view and a side view, respectively, of the sliding cover device 50, with the cover 51 open. FIG. 12C is a cross-sectional view taken along the line XIIC-XIIC shown in FIG. 12A.

Referring to FIG. 12C, when the cover 51 is at the open position, the body surface member 55, forming the top of the case 70, is positioned in the clearances 67 adjoining the arm members 63 of the cover 51. In such a configuration, even if an external force R acting on an edge of the cover 51 to separate the cover 51 from the case 70 is applied, tips 63a of the arm members 63 strongly resist the external force R.

With the arm members 63 and the cam grooves 71 in the side wall 72 configured as described above, a sliding stroke of about a half of the total apparatus length in the sliding direction is assuredly provided while the internal mechanisms are prevented from being exposed, and a sufficient strength is provided by efficiently utilizing the length of the cover 51.

Figure 13:
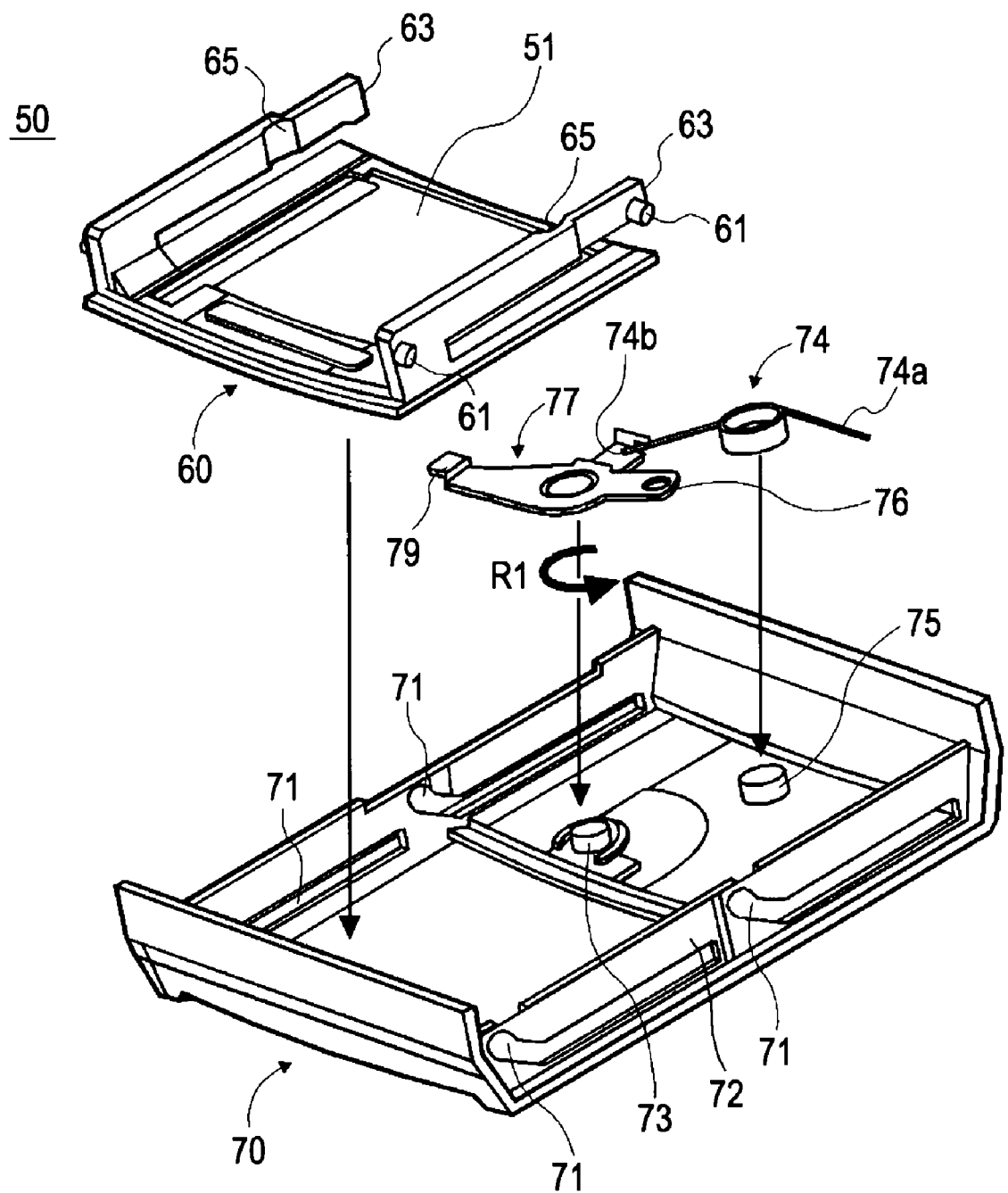
FIG. 13 is an exploded perspective view of the sliding cover device according to the embodiment of the present invention, additionally including an urging-locking mechanism.

FIG. 13 is an exploded perspective view of the sliding cover device 50, additionally including an urging-locking mechanism. The urging-locking mechanism continuously urges the arm members 63 in such a direction that the cover 51 is closed, and locks the cover 51 at the closed position. FIG. 13 shows the back surface (internal configuration) of the sliding cover device 50 in a state where the sliding cover device 50 is rotated by 180 degrees about an axis extending in the sliding direction.

The body surface member 55 has on the back surface thereof a rotatable lever 77 and a torsion spring 74. The rotatable lever 77 is rotatably supported by a post 73, which serves as the rotational axis. The torsion spring 74 is supported by a spring supporting member 75, which is a projection. One end 74a of the torsion spring 74 is secured to the body of the terminal apparatus 100. The other end 74b is locked by a spring catcher, which is a portion of the rotatable lever 77, so that an urging force of the torsion spring 74 is produced. In this fashion, referring to FIG. 13, a rotating force in the counterclockwise direction R1 is applied to the rotatable lever 77 on the post 73. An end 79 of the rotatable lever 77 is in contact with the tip of one of the arm members 63 of the cover 51. In this fashion, the force of the torsion spring 74 acts in such a direction that the cover 51 is automatically moved toward the closed position.

The arm members 63 each have at a position near the tip on the inner wall thereof a recess (notch) 65 serving as an engaging portion that gives a tactile clicking sensation.

The urging-locking mechanism stays on the back surface of the body surface member 55, thereby being out of the user's sight. In addition, even if the cover 51 is open, the urging-locking mechanism, although staying at the back surface of the body surface member 55, does not interfere with the cover unit 60 because no components other than the arm members 63 provided on both sides of the cover unit 60 face the back surface of the body surface member 55.

The rotatable lever 77 includes a connecting arm 76 extending from an end opposite the end 79. In this case, a single rotatable lever 77 is employed. Therefore, the rotating force is transmitted only between the rotatable lever 77 and one of the arm members 63 of the cover unit 60. Alternatively, referring to FIGS. 15A and 15B showing a variation of the embodiment, the urging-locking mechanism may include, in addition to the rotatable lever 77 provided for one of the arm members 63, a follower lever 87 provided for the other arm member 63 with a configuration similar to the rotatable lever 77. A linking member 84 connects the rotatable lever 77 and the follower lever 87 to each other at the connecting arm 76 and a connecting arm 86, respectively, thereof extending from respective ends opposite the end 79 and an end 89, so that the levers 77 and 87 can rotate. With such a configuration, the torsion spring 74 can be shared between the levers 77 and 87. Naturally, a set of the rotatable lever 77, the torsion spring 74, and the spring supporting member 75 may alternatively be provided for each of the two arm members 63. In that case, the connecting arms 76 and 86 are omitted.

Referring to FIGS. 14A to 14D, the principle of a cover-locking operation will now be outlined. FIGS. 14A to 14D sequentially show the process of a cover-sliding operation according to the embodiment, from when the cover 51 is in the closed state until when the cover 51 is fully opened.

Figure 14A:
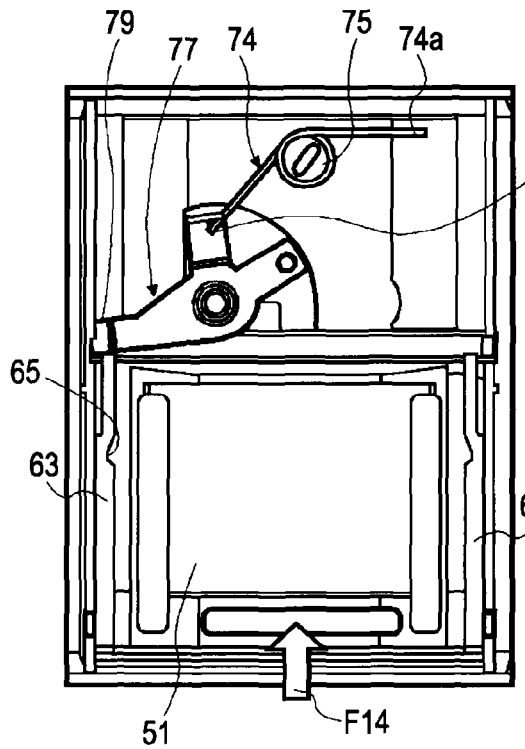
FIGS. 14A to 14D are diagrams for describing the principle of a cover-locking operation performed by the mechanism shown in FIG. 13.

FIG. 14A shows a state where the cover 51 is closed. In this state, a user applies an external force F14 to the cover 51 so as to start the sliding operation. Since the tip of the arm member 63 is in contact with a side of the end 79 of the rotatable lever 77, the arm member 63 moving in the longitudinal direction thereof pushes and rotates the rotatable lever 77 against the spring force of the torsion spring 74. If the external force F14 is removed at this point, the cover 51 automatically returns to the initial position (closed position) because of the spring force of the torsion spring 74. With the application of another external force F15, the cover 51 and the rotatable lever 77 reach the respective positions shown in FIG. 14B. If the external force F15 is removed at this point, the cover 51 still automatically returns to the closed position.

Figure 14B:
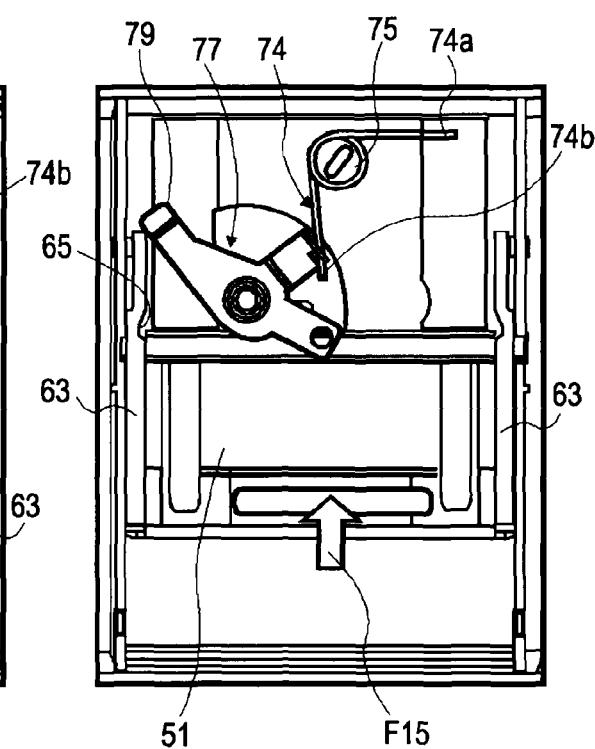
Figure 14C:
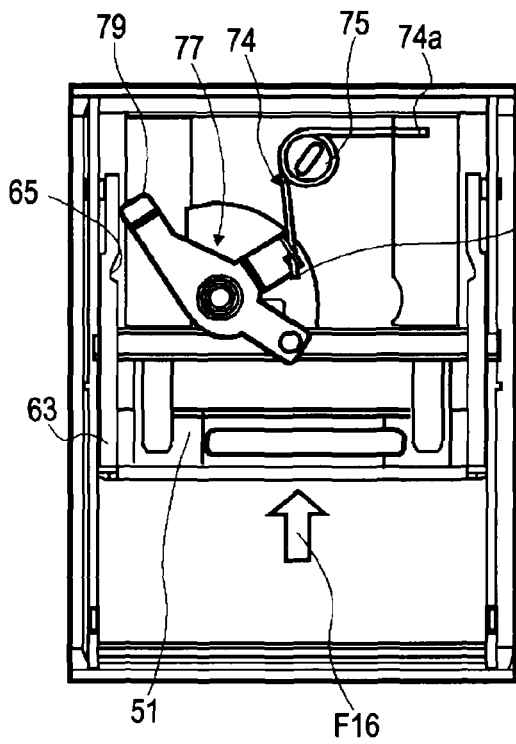

When the user applies another external force F16 to the cover 51, the rotatable lever 77 further rotates to the position shown in FIG. 14C, with the end 79 of the rotatable lever 77 riding onto the side surface of the arm member 63. Once the end 79 is positioned on the side surface of the arm member 63, the cover 51 does not automatically returns to the closed position even with the force applied by the torsion spring 74.

Figure 14D:
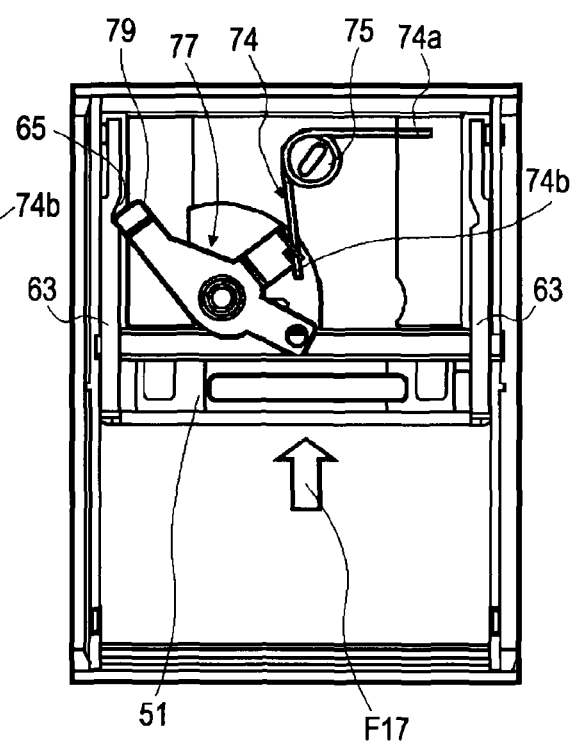

Ultimately, referring to FIG. 14D, with the application of another external force F17, the rotatable lever 77 reaches a stable position. In this state, even if the external force F17 is removed, the cover 51 remains at the open position. Further, the end 79 of the rotatable lever 77 falls (fits) into the recess (notch) 65, serving as the engaging portion, provided in the arm member 63. In this fashion, the position of the arm member 63 in the sliding path is determined, and a slight impact occurring at this time gives the user a tactile clicking sensation. With this clicking sensation, the user can recognize that the cover 51 has moved by the full stroke and reached the locking position, that is, the cover 51 does not return to the closed position even if the pressing force is removed.

To return the cover 51 from the open position to the closed position, the process shown in FIGS. 14A to 14D is performed in the reverse order. Specifically, when the user applies a force toward the closed position to the cover 51 at the open position shown in FIG. 14D, the end 79 of the rotatable lever 77 comes out of the recess 65 of the arm member 63 and rides onto the side surface of the arm member 63, as shown in FIG. 14C. When the user further pushes the cover 51, the end 79 of the rotatable lever 77 residing on the side surface of the arm member 63 returns to the position shown in FIG. 14B, where the end 79 of the rotatable lever 77 is in contact with the tip of the arm member 63 again. In this state, the cover 51 automatically returns to the closed position because of the force applied by the torsion spring 74, even without the user's further application of the force. The length of the movement of the cover 51 from the position shown in FIG. 14D to the position shown in FIG. 14B is only a part (about a half in the case shown in FIGS. 14A to 14D) of the full stroke of the closing movement of the cover 51.

To summarize, according to the embodiment, a flat design can be realized, avoiding a design having a cover projecting from the surface of the apparatus body. Such a design can eliminate user's uneasiness arising from the possibility that the apparatus might be caught in a pocket or be damaged, without affecting the usability of the apparatus.

With such a sliding mechanism and a cam mechanism provided along the side walls of a camera unit, the total apparatus thickness is only affected by the thickness of the camera unit and is not affected by the thicknesses of the mechanisms, and a sliding stroke of about a half of the total apparatus length in the sliding direction can be assuredly provided.

From the viewpoint of the appearance of the apparatus, all the movements of closing and opening the cover can be realized by using only two components, namely, the cover and the case, without exposing major fittings and movement mechanisms.

Such a configuration also contributes to the suppression of wobbling of the cover fitted to the case and provides a sufficient level of strength preventing separation of the cover in opening the cover.

Moreover, regardless of restrictions imposed by the sizes of the camera and other devices, such a configuration can be easily employed in any case where a sliding cover device is desired to become flush with the surface of a body onto which the sliding cover device is mounted.

The embodiment of the present invention is not limited to a mobile phone terminal apparatus and may alternatively be applied to any other portable apparatuses. Commercialization of such apparatuses yields the following advantages:

(1) Business expansion: A new design can be provided, appealing usefulness to users.
(2) Reduction of material cost: Only two major components are to be prepared; calks, screws, reinforcement members, and the like can be omitted.
(3) Reduction of design period: The minimum number of components directly contributes to reduction of the number of design steps.
(4) Reduction of the number of evaluation and checking steps
(5) Stable assembly quality and market quality
(6) Easiness in making variations The embodiment of the present invention described above may also be modified and changed in various other ways. For example, although the embodiment concerns a mobile phone terminal apparatus, the present invention may alternatively be applied to any other small-sized apparatus. In addition, the urging-locking mechanism shown in FIG. 13 is only exemplary and is not limited to the one described above. Moreover, the urging-locking mechanism may be omitted.

The present application contains subject matter related to that disclosed in Japanese Priority Patent Application JP 2008-121872 filed in the Japan Patent Office on May 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal apparatus comprising:
   a camera unit; and
   a sliding cover device including
      a cover slidable with respect to the camera unit;
      a pair of arm members supporting the cover on both sides from a back surface of the cover and extending along the sides of the cover;
      a frame member supporting the arm members such that the arm members are slidable along respectively predetermined sliding paths; and
      a body surface member secured to the frame member and having a surface thereof flush with a surface of the cover at a closed position,
   wherein the sliding paths are defined such that, when the cover is moved from the closed position to an open position, the arm members slide into a space below the body surface member and the cover rides onto the body surface member.

2. The mobile terminal apparatus according to claim 1, wherein the sliding paths are defined such that, when the cover is moved from the closed position to the open position, the cover is lifted up and is subsequently moved parallel to the surface of the body surface member.

3. The mobile terminal apparatus according to claim 1,
   wherein the arm members each have two projecting portions on an outer wall thereof, and
   wherein the frame member has cam grooves in inner walls on both sides thereof, the cam grooves receiving and guiding the projecting portions.

4. The mobile terminal apparatus according to claim 3, wherein each of the cam grooves is provided for a corresponding one of the projecting portions.

5. The mobile terminal apparatus according to claim 1, further comprising:
   an urging-locking mechanism configured to continuously apply an urging force to at least one of the arm members in such a direction that the cover is closed, and to lock the cover at the open position, the mechanism being provided on a back surface of the body surface member.

6. A sliding cover device comprising:
   a cover slidable between a closed position and an open position;
   a pair of arm members supporting the cover on both sides from a back surface of the cover and extending along the sides of the cover;
   a frame member supporting the arm members such that the arm members are slidable along respectively predetermined sliding paths; and
   a body surface member secured to the frame member so as to adjoin the cover at the closed position, and having a surface thereof flush with a surface of the cover at the closed position,
   wherein the sliding paths are defined such that, when the cover is moved from the closed position to the open position, the arm members slide into a space below the body surface member and the cover rides onto the body surface member.

7. The sliding cover device according to claim 6, wherein the sliding paths are defined such that, when the cover is moved from the closed position to the open position, the cover is lifted up and is subsequently moved parallel to the surface of the body surface member.

8. The sliding cover device according to claim 6,
   wherein the arm members each have two projecting portions on an outer wall thereof, and
   wherein the frame member has cam grooves in inner walls on both sides thereof, the cam grooves receiving and guiding the projecting portions.

9. The sliding cover device according to claim 8, wherein each of the cam grooves is provided for a corresponding one of the projecting portions.

10. The sliding cover device according to claim 6, further comprising:
    an urging-locking mechanism configured to continuously apply an urging force to at least one of the arm members in such a direction that the cover is closed, and to lock the cover at the open position, the mechanism being provided on a back surface of the body surface member.

* * * * *